US 6,672,270 B2

(12) United States Patent
Armer

(10) Patent No.: US 6,672,270 B2
(45) Date of Patent: Jan. 6, 2004

(54) FUEL EFFICIENT VALVE MECHANISM FOR INTERNAL COMBUSTION ENGINES

(76) Inventor: Rollin A. Armer, 139 Glorietta Blvd., Orinda, CA (US) 94563

( * ) Notice: Subject to any disclaimer, the term of this patent is extended or adjusted under 35 U.S.C. 154(b) by 0 days.

(21) Appl. No.: 10/271,996

(22) Filed: Oct. 17, 2002

(65) Prior Publication Data

US 2003/0221652 A1 Dec. 4, 2003

Related U.S. Application Data

(60) Provisional application No. 60/384,274, filed on May 31, 2002.

(51) Int. Cl.[7] .............................................. F02N 3/00
(52) U.S. Cl. .................................................. 123/188.4
(58) Field of Search ............................ 123/188.4, 58.9, 123/51 AA, 51 A, 198 F, 90.15, 90.16, 90.17, 90.23, 78 E, 48 B, 48 R, 78 F

(56) References Cited

U.S. PATENT DOCUMENTS 4,397,270 A * 8/1983 Aoyama ................... 123/90.16
5,596,955 A * 1/1997 Szuba ...................... 123/51 AA

FOREIGN PATENT DOCUMENTS

JP 59188056 A * 10/1984 ............ F02D/37/02
WO WO 9119886 A * 12/1991 ............ F01L/7/02

* cited by examiner

Primary Examiner—Tony M. Argenbright
Assistant Examiner—Hyder Ali
(74) Attorney, Agent, or Firm—Harris Zimmerman

(57) ABSTRACT

An internal combustion engine having one or more power pistons reciprocating in one or more cylinders has at least one fuel inlet valve of the piston type at each cylinder. An inlet valve sleeve has an open end at the top of the cylinder and has fuel inlet ports situated away from the cylinder. A valve piston in the sleeve is movable towards the cylinder and away from the cylinder by an actuator system to open and close the valve. The actuator system varies timing and duration of the open periods of the valve to control engine power output thereby eliminating any need for a throttle valve and its attendant power losses. Valve piston movement also varies the effective compression ratio in the engine cylinder as a function of power output thereby further increasing fuel efficiency.

18 Claims, 15 Drawing Sheets

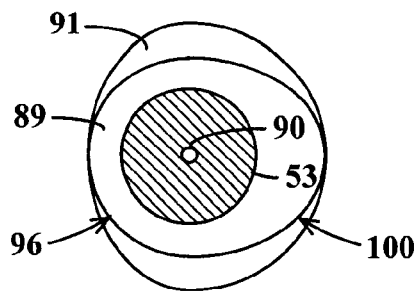 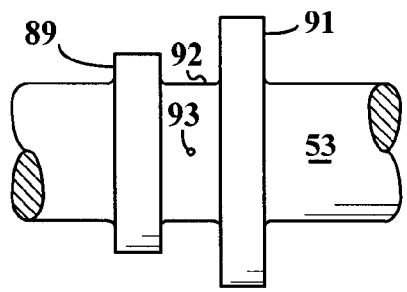
FIG. 18    FIG. 17
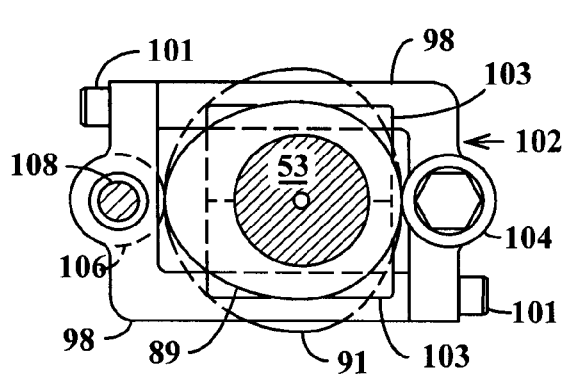 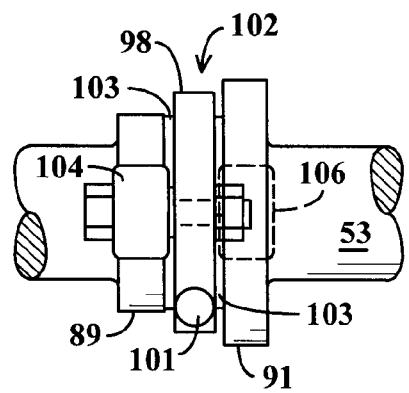
FIG. 19    FIG. 20

FUEL EFFICIENT VALVE MECHANISM FOR INTERNAL COMBUSTION ENGINES

REFERENCE TO RELATED APPLICATION

This application claims subject matter which is disclosed in United States provisional application No. 60/384,274 filed May 31, 2002.

BACKGROUND OF THE INVENTION

This invention relates to internal combustion engines which have one or more power pistons that reciprocate in one or more cylinders. In particular, the invention relates to engines of this type which operate on a four stroke cycle in which the power pistons cyclically undergo fuel inlet strokes, compression strokes, expansion strokes and exhaust strokes. More particularly, the invention relates to inlet valves and valve operating components which admit a fuel and air mixture into the cylinders of engines of this type.

Fuel efficiency may be defined as pounds of fuel consumed per horsepower hour of work delivered. The fuel efficiency of most engines of the above identified type varies greatly as a function of power output or engine speed. Efficiency is highest when the engine is operating at or near its full power output and at a steady speed. Efficiency decreases when the engine is operated at reduced power outputs. Many uses of such engines require that power output be reduced much of the time. This is most notably the case with automobile engines. Automobile engines are designed to provide for occasional periods of high power output. This is needed, for example, to accelerate the vehicle on freeway on-ramps or while passing other vehicles or to maintain speed on an upgrade. Power output is reduced when the vehicle is cruising at a steady speed on a freeway or highway or is slowed by traffic conditions. Power output ceases when the vehicle is temporarily stopped with the engine idling.

The practical result of these factors is that most conventional automobile engines operate with reduced fuel efficiency much of the time. This increases operating cost, unproductively consumes fuel resources and has adverse effects on efforts to reduce emission of pollutants into the environment.

This problem arises in part as the typical automobile engine is designed to have a low compression ratio that provides for optimum performance when the engine operates at or near full power output. A higher compression ratio would provide greater efficiency during the periods when the engine is being operated at reduced power output but, in the conventional engine, the high ratio causes overly rapid fuel burning resulting in detonation or "knocking" at times when the engine must be operated at or near maximum power output. Fuel detonation severely strains engine components, creates unacceptable noise and drastically reduces engine efficiency.

It has heretofore been recognized that more efficient overall operation can be realized by designing the engine to have a compression ratio which varies as a function of engine load. Compression ratio can be high when the load is light as detonation is not a problem under that condition. In engines which operate on the Atkinson cycle, a mechanism is provided which varies the length of travel of the power pistons in the cylinders so that the inlet stroke is much shorter than the power or expansion stroke. Some prior engines have auxiliary pistons which reciprocate in chambers that are communicated with the power piston cylinders. Auxiliary piston movement varies the compression ratio in, response to changes of engine load. The auxiliary pistons take up a substantial amount of space in the combustion chambers. This requires that the inlet and exhaust valves be smaller than would be desirable for optimum breathing capacity. Engines of these prior kinds require bulky additional components which substantially complicate the engine and which are very prone to rapid wearing.

Engines of the Miller cycle type also vary the compression ratio as a function of power output and are not subject to the above described problems. In a Miller cycle engine the effective volume of the cylinders is varied by varying the timing of closing of the fuel inlet valves relative to power piston position. For example, closing of the fuel inlet valve may be delayed until after the intake stroke of the piston is completed and the subsequent compression stroke is underway. Thus actual compression of the fuel charge does not begin until some time after the compression stroke movement of the piston has commenced. This decreases compression ratio by an amount that is determined by the timing of the delay of closing of the fuel inlet valves. The inlet valve actuating mechanism increases the delay when engine power output is increased and decreases the delay when power output is reduced and thereby varies compression ratio as needed to provide for more efficient operation throughout the range of power outputs.

The above described mode of operation of prior Miller cycle engines requires the effective size of the combustion chamber to be relatively small. Consequently, a relatively small charge of fuel is compressed to normally high pressure at the time that combustion begins. The following power stroke utilizes the full cylinder volume. This results in a very high expansion ratio during the power stroke enabling the engine to extract more work from a given charge of fuel. This advantage has not heretofore resulted in extensive use of Miller cycle engines in automobiles as the low effective size of the combustion chamber, relative to cylinder volume, causes the prior engines to have a low power output per liter of piston displacement.

The fuel inlet valves and valve operating mechanism of prior Miller cycle engines are not designed to resolve other problems which also adversely affect fuel efficiency. For example, the operator controls the speed and power output of a conventional engine with a throttle valve which is situated in the flow path of the air and fuel. The engine must expend power in order to draw the mixture through the flow path constriction formed by the throttle valve. This throttling loss is a function of the product of the flow rate through the throttle valve and the pressure difference between the upstream and downstream side of the valve. Throttling loss is minimal when the engine operates at maximum power as the pressure difference across the fully open valve is minimal. The throttling loss is also minimal when the engine is operating at or near idling speed as the flow rate through the valve is minimal at that time. Throttle loss rises substantially and may consume as much as 30% of the engine power at the intermediate region of the engines output power range. As has been pointed out above, automobile engines operate within this intermediate power region much of the time. Elimination of the throttle and its attendant losses would substantially increase fuel efficiency of the engine.

The fuel inlet valves of prior engines create significant additional throttling loss. This is particularly pronounced when the inlet valves are spring biased poppet valves such as are present in modern engines. Poppet valves create a very substantial constriction in the fuel and air mixture flow path at the initial stage of opening of the valve and at the final stage of closing of the valve. Opening of the poppet valve is undesirably gradual as it is momentarily stationary at the start of the opening stage. Closing of the valve is also undesirably gradual as it must be brought to a stationary condition during that period. Reduction of this additional throttling loss at the inlet valve would further enhance fuel efficiency of the engine.

Most engines are designed to produce what is known as the squish effect during the final stage of the compression strokes of the pistons. The spark plug extends into a more or less centered recess in the cylinder head surface which forms the top of the combustion chamber. Other portions of the cylinder head surface, termed squish areas, are very closely approached by the power piston as it reaches top dead center position. This speeds the fuel combustion process by driving highly compressed and heated fuel and air mixture towards the spark plug with a rapid and turbulent motion. Hastening the combustion process enhances power output and output and increases fuel efficiency by avoiding fuel detonation. Detonation occurs when an unburned portion of highly compressed fuel charge reaches the the ignition temperature. A violent total combustion of the fuel charge takes place instantaneously creating an audible "knock". Loss of power, overheating, and engine damage may follow.

Conventional engines have a smaller squish area then would be desirable at low and intermediate loads in order to avoid combustion rumble at high loads. Combustion rumble occurs when the fuel charge burns too fast and differs from detonation in that the burning is not instantaneous. However, it is fast enough to impose excessive loads on the engine bearings and gas turbulence is so great as to transfer too much heat to the cooling system. The transferred heat is lost energy which cannot be converted to useful work in the expansion process.

The present invention is directed to overcoming problems discussed above.

BRIEF SUMMARY OF THE INVENTION

In one aspect the present invention provides a fuel inlet valve system for an internal combustion engine that has at least one power piston which reciprocates within an engine cylinder. The fuel inlet valve system includes a fuel inlet valve having a sleeve with an outlet end that opens into the engine cylinder and having at least one fuel inlet port in a sidewall of the sleeve. A valve piston is movable along a path of travel which extends axially within the sleeve, the valve piston being movable away from the outlet end of the sleeve through open positions at which the inlet port is increasingly communicated with the outlet end and being movable towards the outlet end into closed positions at which fuel flow from the inlet port to the outlet end is blocked by the valve piston. A valve actuator has a first group of components interlinked to the valve piston which cyclically move the valve piston between an open and a closed position in response to turning of the engine camshaft. The valve actuator also has a second group of components interlinked to the valve piston which shift the path of travel of the valve piston away from the outlet end of the valve sleeve in response to power increasing movements of the acceleration control of the engine and which shift the path of travel towards the outlet end in response to power decreasing movements of the acceleration control.

In another aspect the invention provides an internal combustion engine having at least one main piston that reciprocates within an engine cylinder, a fuel inlet valve through which fuel is admitted to the engine cylinder and an acceleration control which is movable in one direction to increase the power output of the engine and movable in an opposite direction to decrease the power output of the engine. The fuel inlet valve is a piston valve having a valve chamber with an outlet end which opens into the engine cylinder and having at least one fuel inlet port in a sidewall of the valve chamber at a location which is spaced away from the outlet end of the chamber. The inlet valve has a valve piston which is movable towards the outlet end of the chamber and away therefrom. The valve piston is movable along a path of travel which includes a first range of valve positions at which fuel flow through the inlet port is increasingly restricted by the piston and further includes a second range of valve positions at which flow through the inlet port is fully blocked by the piston and the piston becomes progressively closer to the outlet end of the valve chamber. Valve actuating components which are coupled to the valve piston include a first group of components that position the valve piston within the first range of valve positions during fuel intake strokes of the power piston and which position the valve piston within the second range of valve positions at other stages of the engine operating cycle. The valve actuating components further include a second group of components which shift the path of travel of the valve piston in response to movement of the engine acceleration control, the path of travel being moved away from the outlet end of the valve chamber in response to movement of the acceleration control in the one direction and being moved towards the outlet end in response to movement of the acceleration control in the opposite direction.

In still another aspect, the invention provides a fuel inlet valve system for an internal combustion engine having at least one power piston which reciprocates in an engine cylinder and having an acceleration control which is movable in a first direction to increase the power output of the engine and which is movable in an opposite direction to decrease the power output of the engine. The fuel inlet valve has a valve chamber with an outlet end which opens into the engine cylinder and which has a fuel inlet port at a location in the chamber that is spaced away from the outlet end. The inlet valve also has a valve piston in the chamber which is movable along a path of travel which extends towards the outlet end of the chamber, the valve piston being movable away from the outlet end through open positions which provide a progressively larger flow path from the inlet port to the outlet end and being movable towards the outlet end to closed positions at which fuel flow from the inlet port to the outlet end is blocked by the valve piston and the valve piston becomes progressively closer to the outlet end. The system further includes first valve actuator means for cyclically moving the valve piston between an open position which enables fuel flow from the inlet port to the engine cylinder and a closed position at which fuel flow is blocked. Second valve actuator means move the path of travel of the valve piston away from the outlet end in response to movement of the acceleration control in the one direction and move the path of travel of the valve piston towards the outlet end in response to movement of the acceleration control in the opposite direction.

The invention provides fuel inlet valve structure and valve operating components which vary several engine operating characteristics to provide for high fuel efficiency throughout the full range of engine power output. The fuel inlet valve controls the flow of air/fuel mixture to vary the power output or speed of the engine. This eliminates any need for a throttle valve and its attendant power losses. The inlet valve also acts to vary the compression ratio and the expansion ratio within the engine cylinder as a function of engine load to provide high fuel efficiency throughout the full range of engine loads. In the preferred form, the inlet valve also varies the effective squish area at the top of an engine cylinder in response to changes of engine load to further optimize performance. The invention provides still other advantages which will hereinafter be described.

The invention, together with further objects and advantages thereof, may be further understood by reference to the following detailed description of the invention and by reference to the accompanying drawings.

BRIEF DESCRIPTION OF THE DRAWINGS

FIG. 17 is a side view of a portion of the camshaft of the engine of the preceding figures.

FIG. 18 is an end view of the portion of the camshaft which is shown in FIG. 17.

FIG. 19 depicts a cam operated shuttle assembly which is a component of the valve actuator mechanism of FIGS. 14 and 15.

FIG. 20 is an end view of the shuttle assembly of FIG. 19.

DETAILED DESCRIPTION OF THE INVENTION

Figures 1, 2:
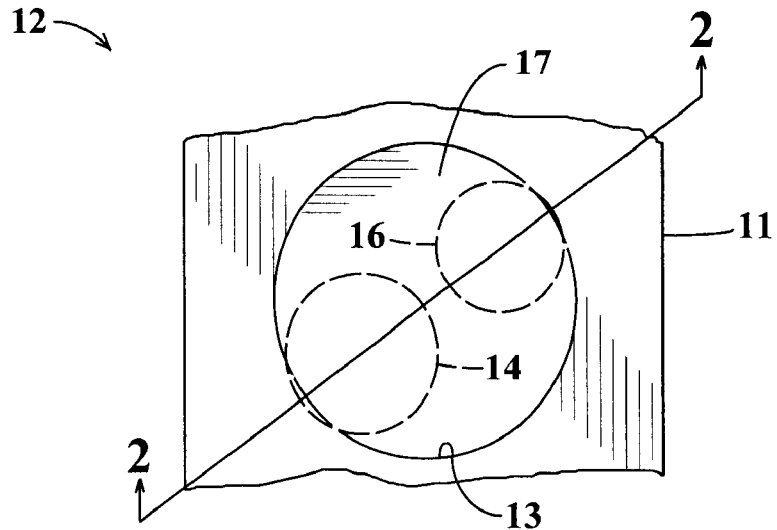
FIG. 1 is a top view of a portion of an engine block of an internal combustion engine depicting the top of a power piston in one of the engine cylinders.
FIG. 2 is an elevation section view taken along angled line 2—2 of FIG. 1 and showing inlet and exhaust valves which are situated in a head member above the power piston.

FIG. 1 of the drawings depicts a portion of the engine block 11 of an internal combustion engine 12 in the region of a single engine cylinder 13. Sectional FIG. 2 is taken along line 2—2 of FIG. 1 which slants across the engine block 11 in order to better illustrate the construction of a fuel inlet valve 14 and an exhaust valve 16 which extend to the top of cylinder 13 at locations that are centered on the slanted line 2—2 rather than on a transverse line through the engine block.

Figure 3:
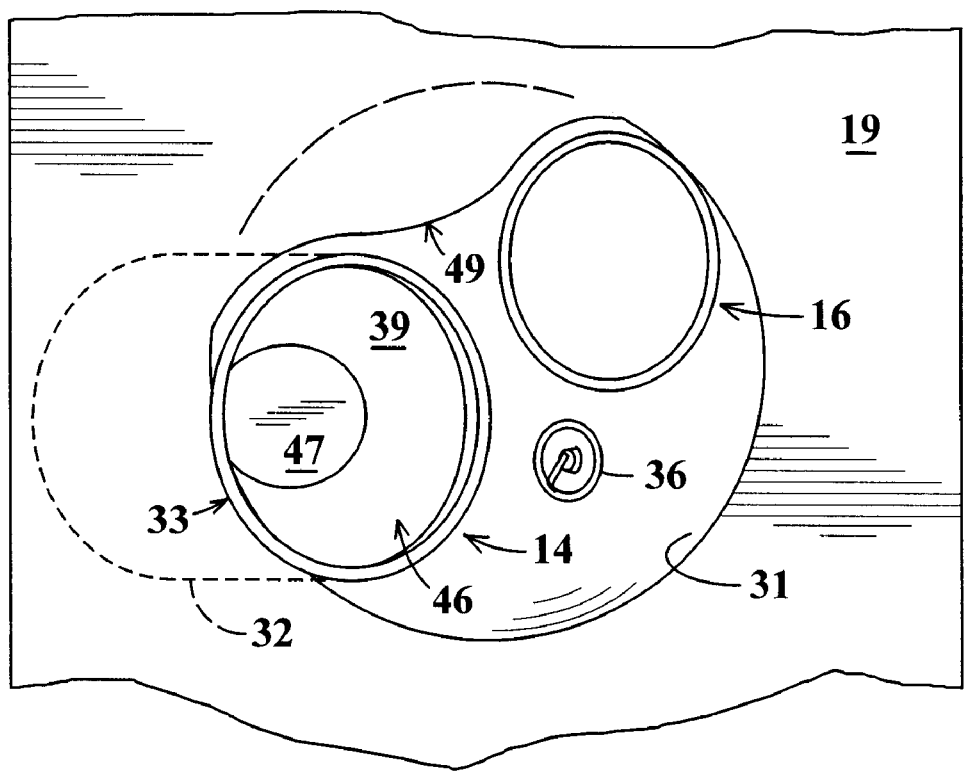
FIG. 3 is a section view taken along line 3—3 of FIG. 2 showing the underside of the engine head member and components which extend to the underside of the head member.

Referring to FIGS. 2 and 3 of the drawings, the invention is applicable to internal combustion engines 12 which have one or more cylinders 13 in which power pistons 17 reciprocate and which operate on a four stroke cycle in which the pistons repetitively undergo fuel inlet strokes, compression strokes, expansion strokes and exhaust strokes. Engines 12 of this type have one or more fuel inlet valves 14 and one or more exhaust valves 16 at the head end 18 of each cylinder 13. This initial example of the invention has a single inlet valve 14 and a single exhaust valve 16 at each cylinder 13.

The inlet and exhaust valves 14 and 16 extend within a cylinder head member 19 which is secured to the engine block 11, a head gasket 21 being disposed between the head member and engine block. Head member 19 and engine block 11 have internal passages 22 through which fluid coolant is circulated in the known manner.

The exhaust valve 16 may be of the conventional poppet type having a circular head 23 from which a stem 24 extends upward into a recess 26 in cylinder head member 19. The circular head 23 seats in a conforming circular valve seat 27 at the underside of head member 19 at the end of an exhaust flow passage 28 in the head member. A compression spring 29 seated in recess 26 biases the exhaust valve 16 to the closed position of the valve. Valve actuator mechanism which will be hereinafter described temporarily opens the exhaust valve 16 during exhaust strokes of the power piston 17.

A conventional fuel inlet valve, which is typically also of the poppet valve type, opens to admit a fuel and air mixture into the engine cylinder during inlet strokes of the power piston and closes to block fuel inflow at other stages of the engine operating cycle. The fuel inlet valve 14 of the present invention is a piston type of valve which also performs other functions that have heretofore required separate components. Inlet valve 14 varies the inflow of fuel to control power output of the engine 12 thereby eliminating any need for the conventional throttle valve and its attendant power losses. Inlet valve 14 also varies the compression ratio at cylinder 13 as a function of engine power output to optimize fuel efficiency throughout the full range of power outputs. The inlet valve 14 also increases the squish area in the combustion chamber of cylinder 13 at minimum or near minimum power output to accelerate fuel combustion and reduces the squish area at higher power outputs to avoid overly rapid fuel combustion and its adverse effects such as combustion rumble.

Head member 19 has a combustion chamber extension recess 31 situated at the top of cylinder 13. Fuel inlet valve 14 is formed in part by a hollow cylindrical sleeve 32 which extends into head member 19 and which has a lower or outlet end 33 that opens into recess 31. Sleeve 32 is inclined relative to the central axis 34 of cylinder 13 and offset in a sideward direction from axis 34 to provide room for exhaust valve 16 and for a conventional spark plug 36 (shown in FIG. 3) at recess 31. Owing to the inclination of sleeve 32, the outlet end 33 is also inclined and extends from the bottom of recess 31 to the top of the recess.

Spaced apart fuel inlet ports 37 in the sidewall of sleeve 32 are equidistant from the outlet end 33 of the sleeve. Ports 37 are situated within a fuel and air mixture inlet passage 38 of engine head member 19 which receives the fuel and air mixture from a carburetor or from a fuel injector and air manifold in the conventional manner.

The inlet valve 14 further includes a cylindrical valve piston 39 in sleeve 32 having a diameter conforming to the inside diameter of the sleeve. Valve piston 39 is movable axially within sleeve 32 by a link rod 41 which is pivoted to the upper end of the valve piston by a wrist pin 42. Link rod 41 connects to the valve actuator mechanism which will hereinafter be described. Upper and lower piston rings 43 and 44 respectively encircle the valve piston 39 to provide sealing between sleeve 32 and the piston. Upper piston ring 43 is at a location on valve piston 39 which remains above the fuel inlet ports 37 at all stages of travel of the valve piston. Lower piston ring 44 travels between a location which is below the fuel inlet ports 37 to a location which is slightly above the fuel inlet ports as the valve piston is raised from its lowermost position to its uppermost position.

To provide for an enhanced squish effect when the engine is operating at or near minimum power output, the lower end 46 of valve piston 39 is shaped to protrude into recess 31 when the valve piston is at or near its lowermost position in sleeve 32. A flat portion 47 of the lower end of the valve piston 39 extends in parallel relationship with the top of the engine power piston 17 and is coplanar with the undersurface of engine head member 19 when the valve piston is at the lowermost limit of its travel.

Referring to FIG. 3 in particular, the flat portion 47 of lower end 46 of the valve piston is of oval shape in this example and extends only partially across the lower end of the valve piston, the other portion 48 of the lower end being a conical surface which is truncated by the flat portion. Flat portion 47 extends from the lowermost point on the outlet end 33 of the inclined valve sleeve 32 when valve piston 39 is at the lowermost limit of its travel.

Combustion chamber extension recess 31 in the engine head member 19 has a non-circular shape as a squish area portion 49 of the flat undersurface of engine head member 19 extends out over a portion of the top of the engine cylinder 13. The flat portion 47 of valve piston 39 functions as additional squish area when the valve piston is at or near its lowermost limit of travel which occurs when the engine is operating at or near minimum power output. The flat area 47 does not travel all the way to outlet end 33 of sleeve 32 when the engine is operating at or near maximum power output and does not provide any additional squish effect under that condition.

Figure 4:
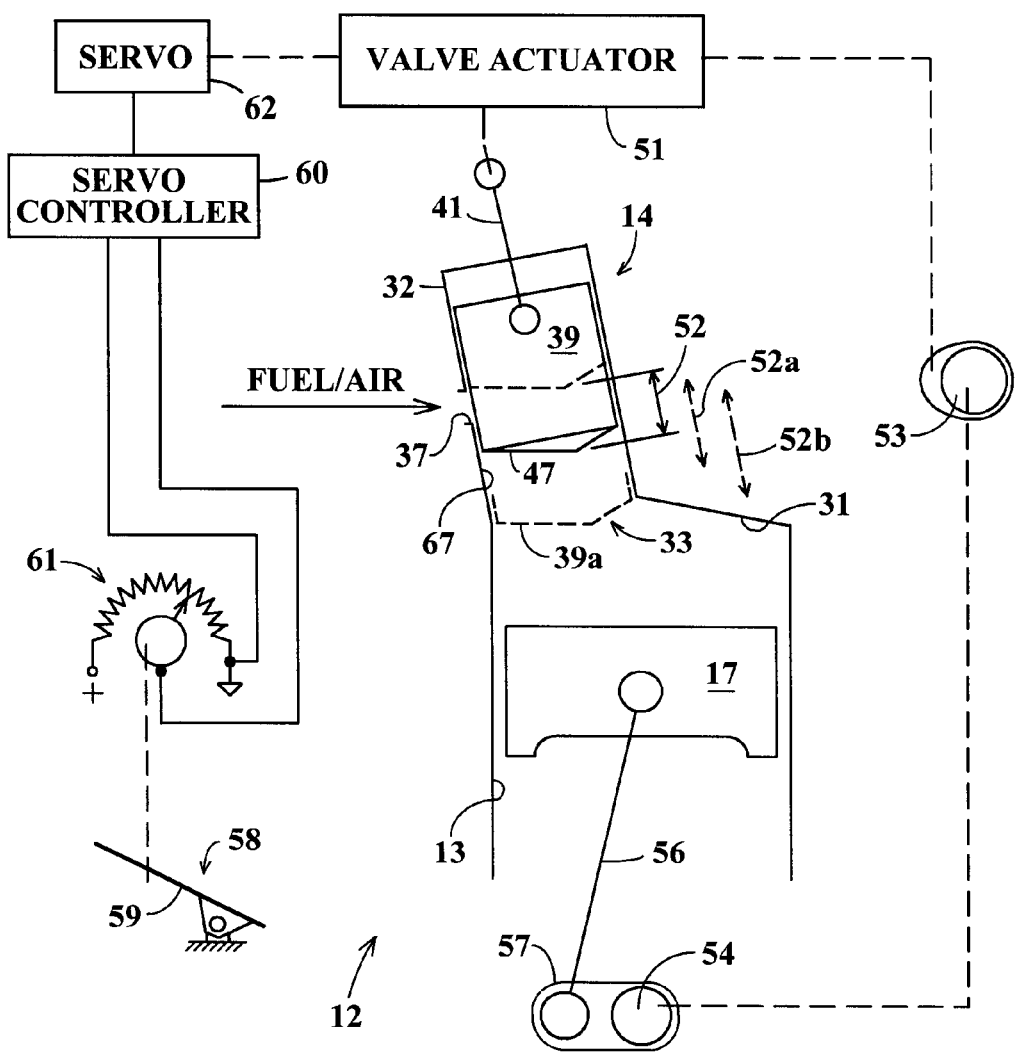
FIG. 4 is a schematic diagram depicting additional components of the engine of the preceding figures and depicting the interactions of the components with each other.

Schematic FIG. 4 depicts interconnections between the inlet valve 14 and other components of the engine 12. Link rod 41 which is pivoted to the valve piston 39 in the previously described manner is coupled to a valve actuator 51 which moves the valve piston along a path of travel 52 that extends axially within sleeve 32. A suitable detailed construction of the valve actuator 51 will be hereinafter described. Valve actuator 51 opens and closes the inlet valve 14 in response to rotation of the engine camshaft 53. Camshaft 53 is rotated by the engine crankshaft 54 by means of a belt or gearing in the conventional manner and turns at one half of the speed of the crankshaft. A connecting rod 56 couples power piston 17 to an off-center crank portion 57 of the crankshaft 54 also in the conventional manner. Valve actuator 51 shifts the path of travel 52, 52a, 52b of valve piston 39 outward from engine cylinder 13 and also shortens the path of travel in response to power increasing movement of the engine acceleration control 58 and advances the path of travel towards the engine cylinder 13 and also lengthens the path of travel in response to power decreasing movement of the acceleration control 58.

The acceleration control 58 in a vehicle is typically afoot operated acceleration pedal 59. Motion of the acceleration control 58 can be transmitted to valve actuator 51 by mechanical linkage if desired but, preferably, a force amplifying servomotor 62 adjusts the valve actuator 51 in response to pedal movement. In the present example, an electrical potentiometer 61 is operated by pedal 58 and transmits a voltage to a servomotor controller 60 which voltage varies in response to changes in the position of the pedal. The servomotor 62 responds by adjusting the valve actuator 51 in a manner which will hereinafter be described.

At the beginning of an inlet stroke the power piston 17 is at its top dead center position in cylinder 13 and crankshaft 54 is at what will be termed the 0° position in its revolution. Responding to turning of camshaft 53, valve actuator 51 opens inlet valve 14 at or near the beginning of each inlet stroke of engine piston 17. Power output of the engine is controlled by delaying closing of the inlet valve 14 for a period that is determined by the position of accelerator pedal 59. A power increasing movement of accelerator pedal 59 causes closing of the inlet valve 14 to be delayed until a later stage in the revolution of crankshaft 54. A power decreasing movement of the accelerator pedal 59 shortens the period that inlet valve 14 remains open during the revolution of crankshaft 54. This varies the amount of fuel and air mixture which is admitted into cylinder 13 during intake strokes of engine piston 17 and thereby varies the power output or speed of the engine in response to operation of accelerator pedal 59.

FIGS. 5 to 8 are diagrammatic inlet valve timing circles in which radial lines IO indicate the timing of inlet valve opening with reference to engine crankshaft rotation in degrees. Radial lines IC identify the timing of inlet valve closing. Dashed radial lines indicate the midpoints of the open intervals of the valve. Radial lines TDC indicate the zero degree position of the crankshaft 54 at which the power piston 17 of the engine is at its top dead center position and radial lines BDC indicate the bottom dead center position.

Figure 5:
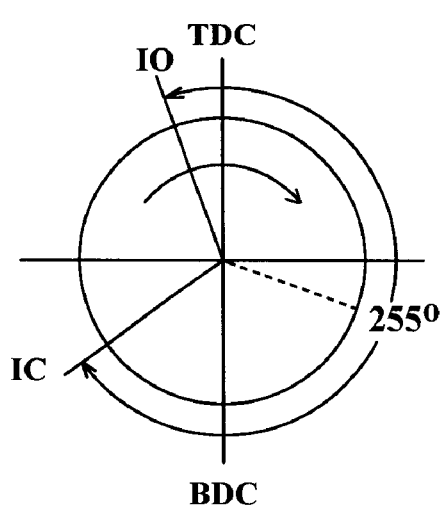
FIG. 5 is a diagrammatic inlet valve timing circle showing the timing of opening and closing of an inlet valve, in relation to power piston position, of a conventional inlet valve of the poppet type.

For purpose of comparison, FIG. 5 shows the inlet valve timing of a typical conventional inlet valve of the poppet type. Opening of a valve of that type is relatively gradual as the valve is stationary when it begins to open and inertia resists opening. Closing is also relatively gradual as the valve motion is being slowed to return the valve to the stationary state. Opening of the poppet inlet valve typically begins at about twenty degrees before top dead center and ends at about fifty five degrees after bottom dead center. This long open period provides good fuel efficiency at high power outputs but reduces efficiency at lower power outputs. At a lower power output the engine piston draws in more fuel and air mixture than is needed at that power level and blows part of it back through the inlet valve before actual compression in the cylinder begins. The present invention varies the timing of opening and closing of the inlet valve as a function of engine load to provide high efficiency throughout the full range of power outputs.

Figure 6:
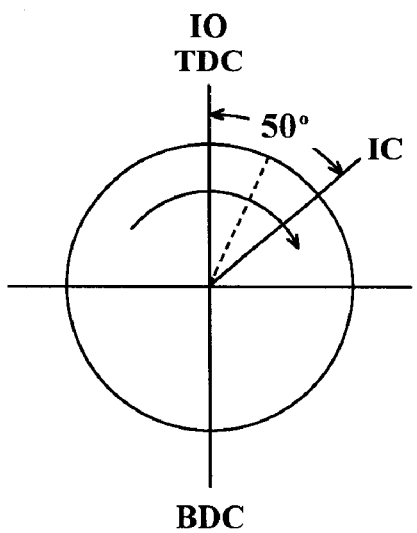
FIG. 6 is a diagrammatic inlet valve timing circle showing the timing of opening and closing of the inlet valve of an example of the present invention when the engine is idling or operating at minimum power output.
Figure 7:
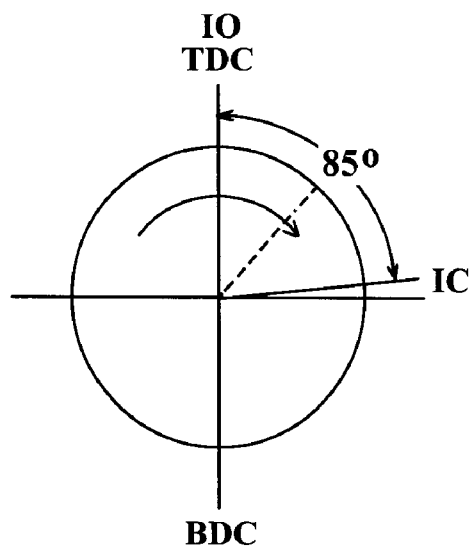
FIG. 7 is a diagrammatic inlet valve timing circle showing the timing of opening and closing of the inlet valve of an example of the present invention when the engine is idling or operating at an intermediate power output.
Figure 8:
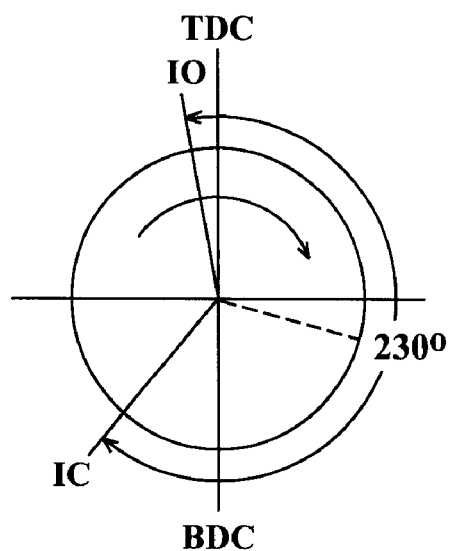
FIG. 8 is a diagrammatic inlet valve timing circle showing the timing of opening and closing of the inlet valve of an example of the present invention when the engine is operating at full power output.

For example, FIG. 6 depicts inlet valve timing at minimum power output in an example of the present invention. The valve opens at the top dead center position of the engine piston and closes after only 50° of crankshaft rotation. FIG. 7 depicts timing at the same inlet valve at an intermediate engine speed such as at ten to fifteen percent of full power output. The valve still opens at the top dead center position of the engine power piston but now closes after 85° of crankshaft rotation. FIG. 8 shows timing at the same inlet valve when the engine is operating at full power output. The valve is now opened at about 10° before the top dead center position of the engine piston and closes after 230° of crankshaft rotation. Thus the valve always opens at or near the top dead center position of the power piston while the duration of the open period progressively increases as power output is increased. The midpoint of the open duration of the valve, indicated by dashed radial lines in FIGS. 6, 7 and 8, occurs at progressively later stages of power piston travel as power output is increased.

The early closing of the inlet valve at lower power outputs causes the descending engine power piston to expend energy creating a partial vacuum in the engine cylinder during the final stage of the inlet stroke. This does not cause any power loss as the expended energy is recovered during the initial stage of the subsequent compression stroke. The partial vacuum draws the engine piston upward during the initial stage of the compression stroke.

Figure 9:
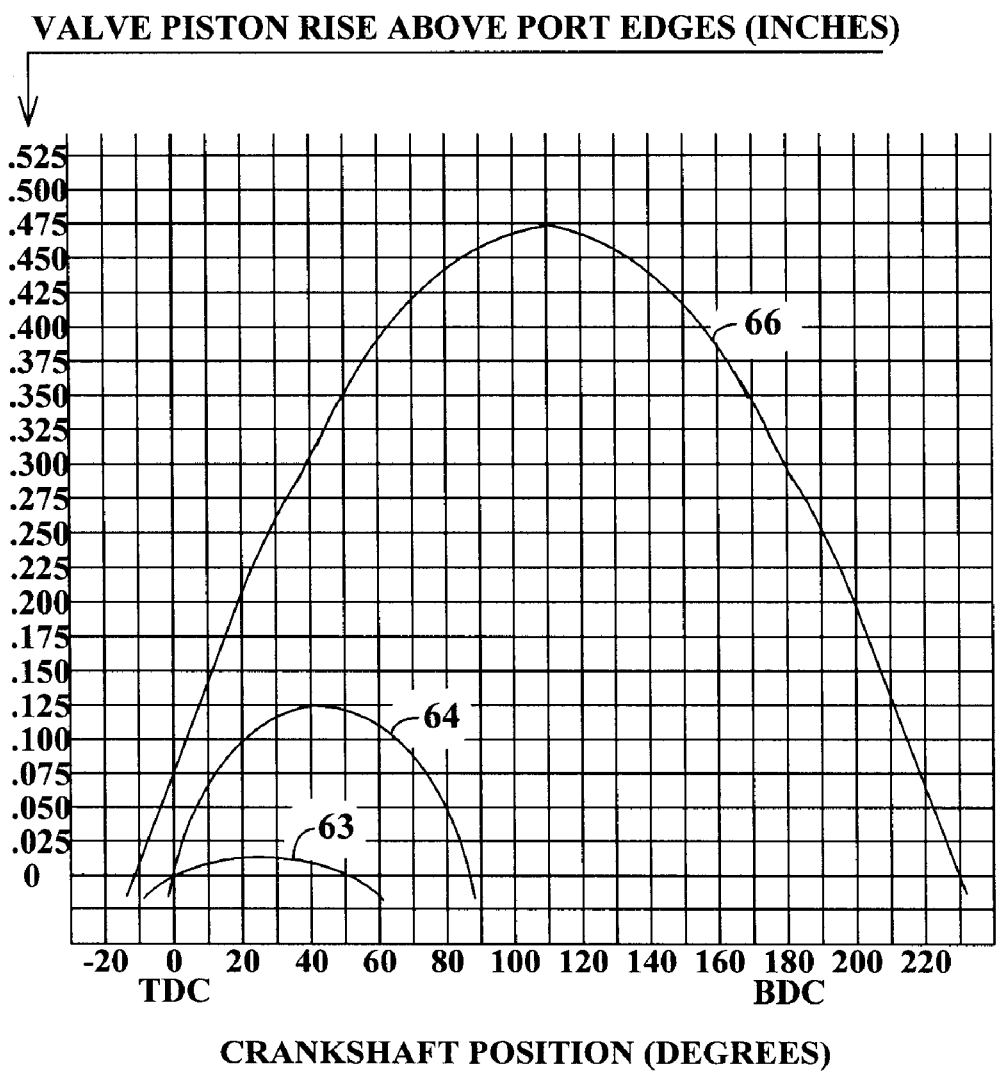
FIG. 9 is a graph showing the timing of opening and closing of the inlet valve of the present invention in relation to engine crankshaft rotation at minimum power output, an intermediate power output and at full power output and also showing variations of the extent of opening of the inlet valve at the different power outputs.

FIG. 9 is a graph showing variation in the extent and duration of opening of the fuel inlet ports of the inlet valve under the three different operating conditions depicted in FIGS. 6, 7 and 8. Curve 63 of FIG. 9 shows the travel of the inlet valve piston above the lower edge of the fuel inlet ports during the minimum power output condition of the FIG. 6 timing circle. Curve 64 of FIG. 9 shows the travel of the inlet valve piston during the intermediate power output condition of the FIG. 7 timing circle. Curve 66 of FIG. 9 shows valve piston travel relative to the inlet ports under the full power operating condition of FIG. 8. The areas which are under curves 63, 64 and 66 and above the horizontal zero rise line in FIG. 9 are proportional to the breathing ability of the inlet valve under the three different operating conditions.

Referring again to FIG. 4, valve actuator 51 moves the path of travel 52 of valve piston 39 outward from the cylinder in response power increasing movement of accelerator pedal 59 and moves the path of travel towards the cylinder in response to power decreasing movement of the pedal. The path of travel 52 is also shortened as it is moved away from the cylinder 13 and lengthened as it is moved towards the cylinder. These actions vary the effective compression and expansion ratios in engine cylinder 13. At the closed position of the inlet valve 14 during maximum power output the valve piston 39 is at the location shown in solid lines in FIG. 4. The valve piston 39 is spaced away from the outlet end 33 of valve sleeve 32. The lower region 67 of sleeve 32 which is below the valve piston 39 is in effect an extension of the combustion chamber of engine cylinder 13. Consequently the compression ratio within cylinder 13 is relatively low. Owing to the above described movement and lengthening of the path of travel 52 of valve piston 39, the valve piston is at the location indicated by dashed line 39a in FIG. 4 when the valve is in the closed condition and the engine is operating at minimum power output. Under this condition the valve piston 39 fills the lower region 67 of sleeve 32 and the compression ratio in cylinder 13 is maximized. The location of valve piston 39 in sleeve 32 at the closed position of the valve is progressively raised as power output is increased and is progressively lowered as power output is increased. This causes progressive changes of the compression ratio which optimize fuel efficiency throughout the full range of power outputs.

Figure 10:
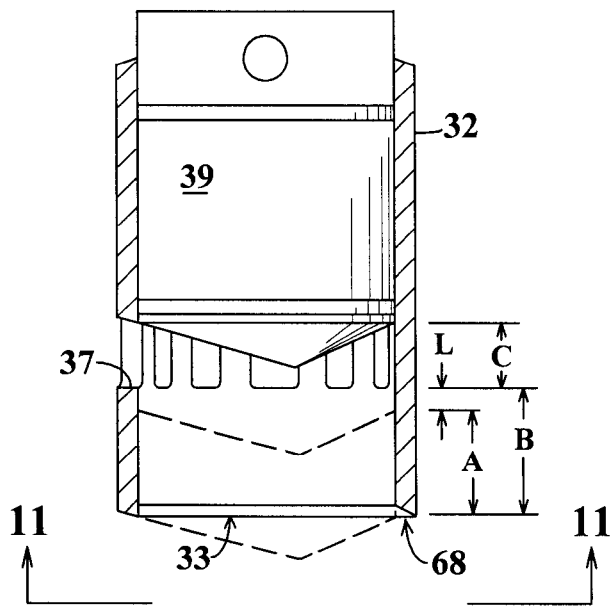
FIG. 10 is an elevation section view of the inlet valve of the engine.
Figure 11:
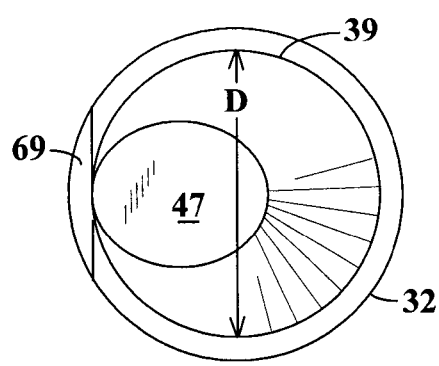
FIG. 11 is a view of the underside of the inlet valve of FIG. 10 taken along line 11—11 thereof.

Optimizing of the performance of engine 12 is dependent on the proportions of components of the inlet valve 14 in relation to the diameter of the engine power piston 17 and the length of the stroke of the power piston. Significant parameters are identified in FIGS. 10 and 11. The diameter of valve piston 39 in this example of the invention, designated by letter D in FIG. 11, is about 54% of the diameter of the engine power piston. This provides for volume changes of the combustion chamber which are sufficient to vary the compression ratio in the above described manner while using valve actuator mechanism which is suitably sized for containment under the hood of a vehicle engine compartment. The distance between the closed position of valve piston 39 at minimum power output and the closed position at maximum power output, which distance is designated by letter A in FIG. 10, is 24% of the stroke of the engine power piston. Spacing of the lower edges of fuel inlet ports 37 from outlet end 33 of sleeve 32, designated by letter B, is 31% of the power piston stroke. This establishes a minimum lap distance, designated by letter L, which is the distance that the valve piston 39 extends below inlet ports 37 when the inlet valve is closed with the engine operating at maximum power output. The lap distance L is 7% of the power piston stroke under that condition and increases as the power output of the engine is reduced. Valve piston 39 travel at minimum power output is just slightly greater than B in order to admit sufficient fuel and air mixture to keep the engine operating at idling speed. Letter C designates the height of the fuel inlet ports 37. The extended path of travel of valve piston 39 at maximum power output is slightly greater than L plus C.

Figure 12:
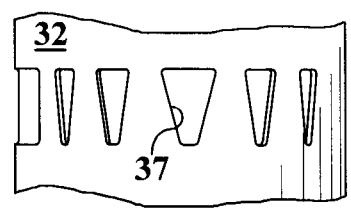
FIG. 12 depicts a first modification of the shape of fuel inlet ports in the inlet valve which alters the rate of change of fuel inflow in response to valve piston movement.
Figure 13:
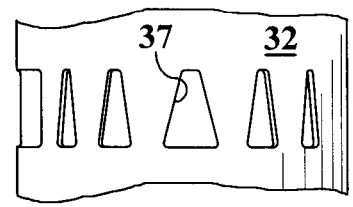
FIG. 13 depicts a second modification of the shape of the fuel inlet ports in the inlet valve which alters the rate of change of fuel inflow in response to valve piston movement in an opposite manner.

Matching of the amount of fuel and air mixture that is admitted through inlet valve 14 with the differing compression ratios at the closed positions of the valve can be fine tuned by altering the shape of the fuel inlet ports 37. The fuel inlet ports 37 in this example of the invention are of rectangular shape. FIG. 12 depicts a first modification in which each inlet port 37 is broad at the top and becomes progressively narrower towards the bottom of the port. This provides for variations of the size of the flow path into the valve 14 in response to valve piston movement that are more extensive at the higher power outputs than at the lower power outputs. FIG. 13 depicts another modification of ports 37 in which the ports are narrower at the top than at the bottom. This causes the variation of the size of the flow path caused by valve piston movement at higher power outputs to be less extensive than the variation at lower power outputs.

Referring again to FIGS. 10 and 11, the outlet end 33 of valve sleeve 32 has a conical bevel 68 which aids gas flow out of and into the lower region 67 of the sleeve. A small flat zone 69 at the lowermost portion of outlet end 33 is oriented to be coplanar with the underside of the engine head member and to be coplanar with the squish enhancing flat area 47 at the bottom of valve piston 39 when the valve piston is at its lowermost position. Thus the sleeve 32 itself does not protrude into the engine cylinder.

Referring again to FIG. 4, a piston type of inlet valve 14 proportioned as described above varies the compression ratio in cylinder 13 between 9:1 at maximum power output and 19:1 at minimum power output. This range is appropriate for a 0.55 liter cylinder operating with regular unleaded gasoline fuel. Proportions of the valve can be varied to provide other ranges of compression ratio as may be appropriate for other engines.

Figure 14:
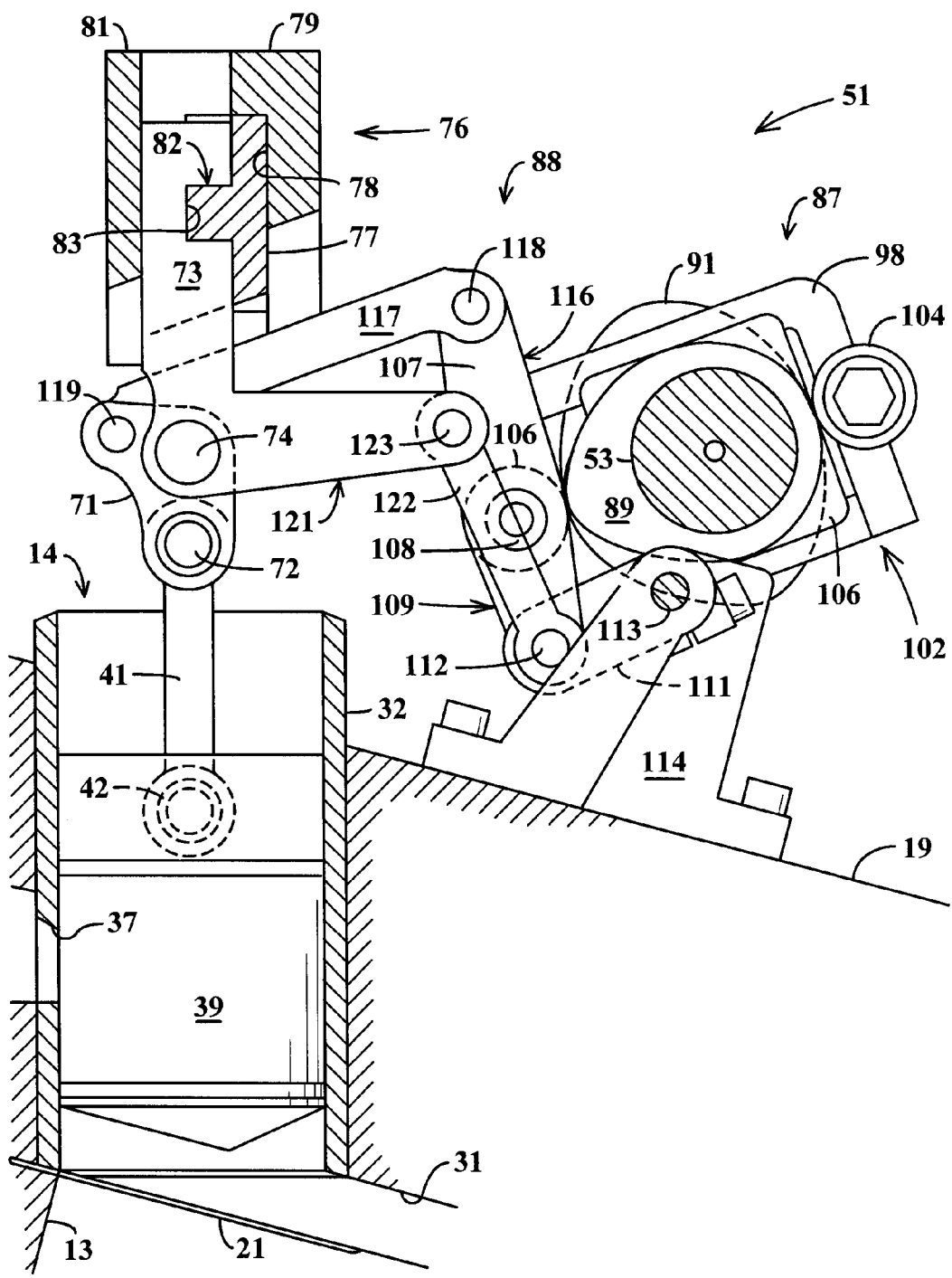
FIG. 14 is a cross section view of valve actuator mechanism of the engine of the preceding figures.
Figure 15:
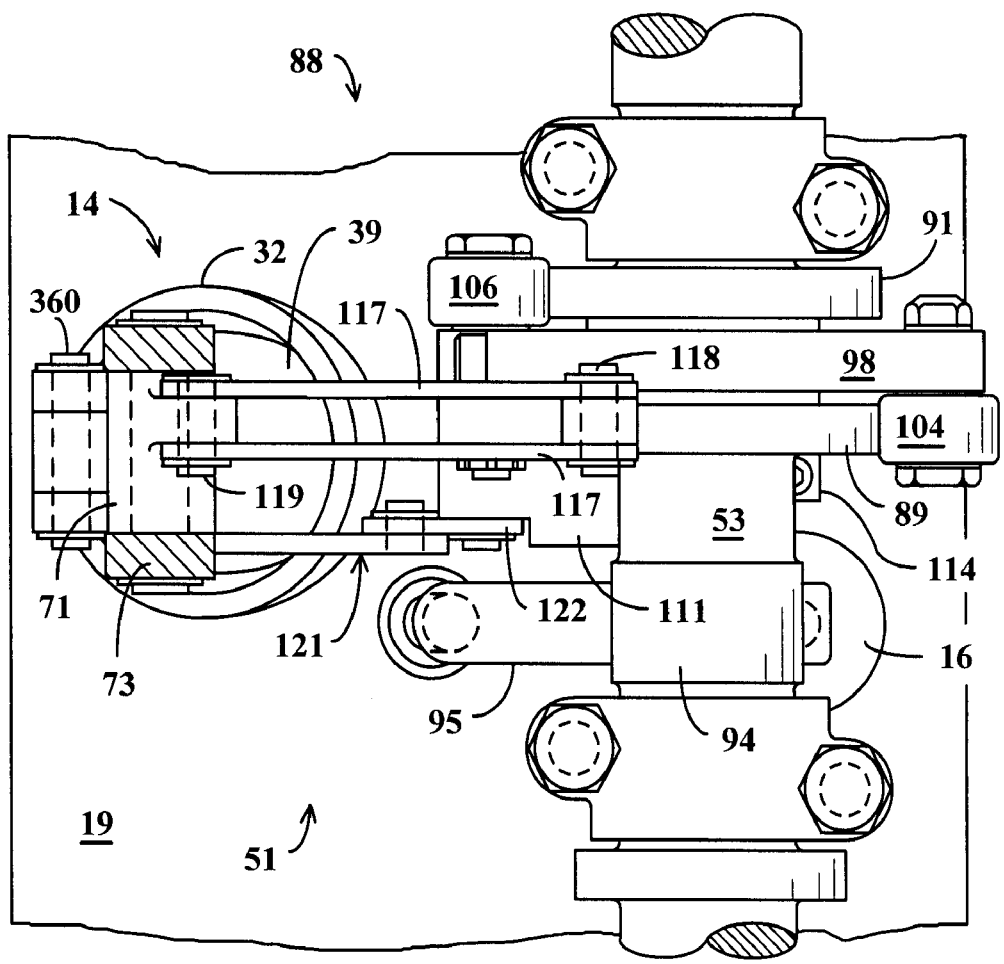
FIG. 15 is a top view of the valve actuator mechanism of FIG. 14.

The valve actuator 51 which travels valve piston 39 in the above described manner is preferably of the relatively compact and wear resistant form shown in FIGS. 14 and 15 although other mechanisms can also perform equivalent operations. FIG. 14 shows the engine 12 in a tilted orientation so that the inlet valve 14 appears to be upright as this facilitates understanding of the operation of the valve actuator 51.

Figure 16:
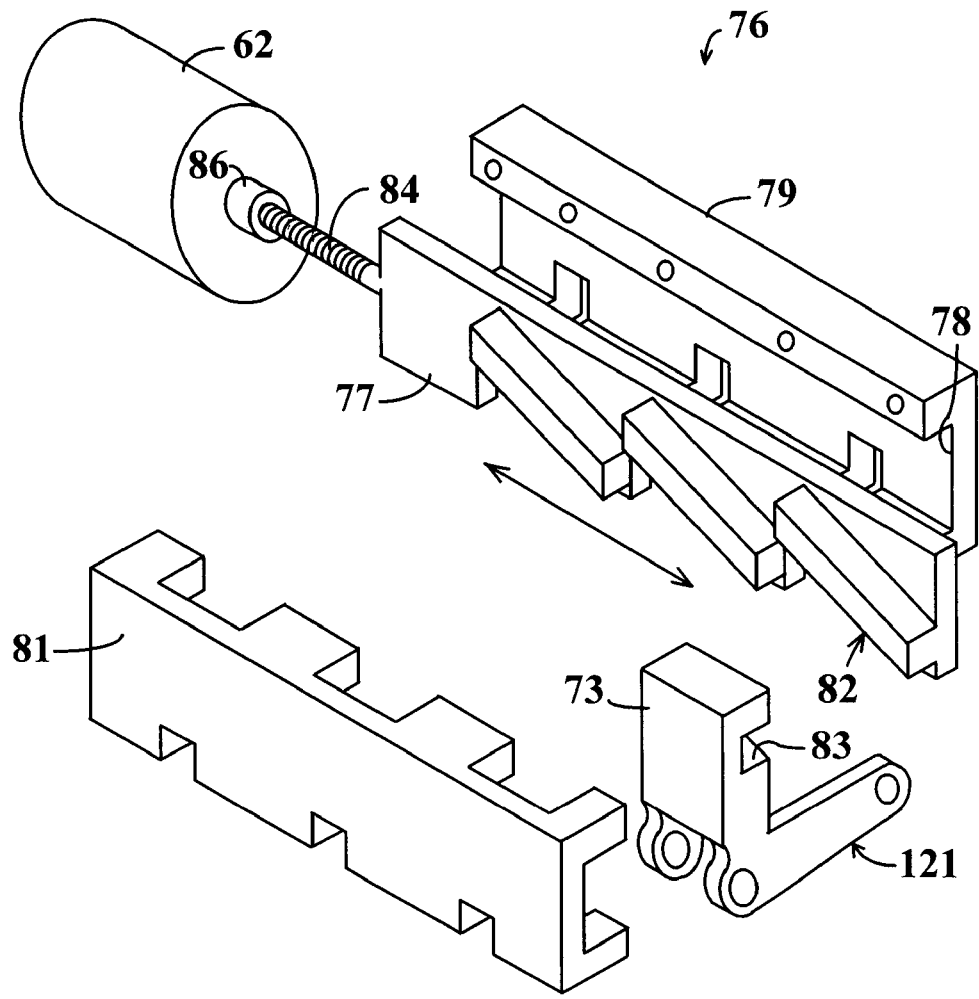
FIG. 16 is an exploded view better showing component parts of a valve piston travel varying assembly of FIG. 14.

Referring jointly to FIGS. 14 and 15, link rod 41 of the inlet valve 14 is pivoted to one arm of an angled bell crank 71 by a first pivot pin 72. The bell crank 71 is coupled to an angled anchoring clevis 73 by a second pivot pin 74. Anchoring clevis 73 extends upward into a fixed anchor frame assembly 76 and is movable relative to the anchor frame assembly. Power output of the engine is increased by moving clevis 73 further outward from inlet valve 14 and power output is decreased by moving the clevis closer to the inlet valve. The clevis 73 is moved in this manner by translation of a power control rack 77 which extends within anchor frame assembly 76. With reference to FIGS. 14 and 16, rack 77 travels in a track slot 78 formed in an anchor frame member 79 and is held in place by a retainer 81 that is secured to the frame member. Rack 77 has a ramp projection 82 which extends into a conforming slot 83 in anchoring clevis 73, the projection and slot being inclined relative to the direction of travel of the rack. Thus movement of rack 77 in one direction moves clevis 73 closer to inlet valve 14 and rack motion in the opposite direction draws the clevis further outward from the inlet valve.

Referring to FIG. 16 in particular, rack 77 is translated to vary power output by the previously described servomotor 62. An externally threaded lead screw 84 extends from the rack 77 into servomotor 62 and engages an internally threaded coupling 86 at the rotor of the servomotor. The rack 77 shown in FIG. 16 has three inclined ramp projections 82 in order to control three fuel inlet valves at three engine cylinders simultaneously. Different engine designs have different numbers of cylinders in a row of engine cylinders and thus the rack 77 may have a different number of ramp projections 82.

Referring again to FIGS. 14 and 15, valve piston 39 is moved upward and downward to open and close the inlet valve 14 by a cam follower assembly 87 which is coupled to both anchoring clevis 73 and bell crank 71 by a system of movable links 88 and which is disposed at the engine camshaft 53. Referring to FIGS. 17 and 18, the portion of camshaft 53 at which the cam follower assembly is situated is formed with a first cam 89 which is spaced from a second cam 91 by a circular groove 92. Lubricating oil may be directed into the groove 92 through an axial passage 90 in the camshaft 53 that has an opening 93 at the base of groove 92. An additional cam 94 on camshaft 53 pivots a rocker lever 95 in the conventional manner to open the exhaust valve 16 during exhaust strokes of the engine power piston.

First cam 89 has a heel region 96 of constant diameter which is continuous with a cycloidal lobe region 100 that extends further outward from the axis of camshaft 53. In this particular example of the invention, heel region 96 has a diameter of 1.562 inches and lobe region 100 extends an additional 0.35 inches away from the axis of the camshaft 53. Second cam 91 has a profile which is the mathematical opposite of the profile of the first cam 89. In other words, first cam 89 is shaped to reciprocate a cam follower situated at one side of camshaft 53. Second cam 91 is shaped to impart the same motion to another cam follower at the opposite side of the camshaft.

The profiles of cams 89 and 91 establish the duration of open periods of the inlet valve and can be changed, if desired, to increase or reduce the duration of the open periods.

Referring to FIGS. 19 and 20, cam follower assembly 87 includes two right angled frame members 98 which are joined by bolts 101 to form a rectangular shuttle frame 102 which is disposed between cams 89 and 91 and which extends at right angles to camshaft 53. Frame 102 is supported by two bearing blocks 103 which jointly encircle the camshaft 53 at groove 92 and which have longitudinal slots 103 along which frame members 98 extend. Thus the shuttle frame 102 may be translated in a direction which extends at right angles to camshaft 53 and, together with bearing blocks 103, may be turned angularly relative to the camshaft.

A first cam follower roller 104 at one end of shuttle frame 102 is positioned to be contacted by the first cam 89 and a second cam follower roller 106 at the opposite end of the frame and on the opposite side of the frame contacts the second cam 91. Consequently, rotation of the camshaft 53 and cams 89 and 91 cyclically translates the shuttle frame 102 back and forth in a direction which extends at right angles to the camshaft.

Referring again to FIGS. 14 and 15, linkage 88 moves the valve piston 39 of inlet valve 14 between the open and closed positions of the valve in response to the cyclical reciprocation of shuttle frame 102. For this purpose linkage 88 includes a lever 107 which is pivoted to the shuttle frame 102 at an intermediate location along the lever by the pivot axle 108 of the second cam follower roller 106. A downward extending arm 109 of lever 107 is coupled to one end of a lever positioning link 111 by a pivot 112. The other end of link 111 is pivotally coupled to a fixed pin 113 that is supported by a stanchion 114 which extends upward from engine head member 19. An upward extending arm 116 of lever 107 is coupled to one end of a motion transmitting link 117 by a pivot 118. Another pivot 119 couples the other end of the motion transmitting link 117 to the previously described bell crank 71. Pivot 119 is offset in a radial direction from the pivot 74 which couples bell crank 71 to anchoring clevis 73 and is spaced apart from the pivot 72 which couples the bell crank to valve piston link rod 41.

Thus the linear reciprocation of shuttle frame 102 caused by turning of cams 89 and 91 acts through lever 107 and motion transmitting link 117 to cause an angular oscillation of bell crank 71 which raises and lowers valve piston 39 to open and close the inlet valve 14.

Bell crank 71 is raised and lowered in response to movement of the power control rack 77 as has been previously described. Linkage 88 adjusts to this vertical movement by changing the angular orientation of shuttle frame 102 relative to camshaft 53 and cams 89 and 91. For this purpose, anchoring clevis 73 has an arm 121 which extends towards lever 107. A connector link 122 is coupled to the end of arm 121 by a pivot 123 and is coupled to the lower arm 109 of lever 107 at pivot 112. Thus, raising of anchoring clevis 73 to increase power output acts through arm 121, link 112 and lever 107 to turn shuttle frame 102 clockwise as viewed in FIG. 14 and lowering of the clevis turns the frame in an opposite direction. The change in angular orientation of the shuttle frame 102 changes the extent of the angular oscillation of bell crank 71. This varies the length of the stroke of valve piston 39 as a function of engine power output and also brings about the changes in the relative durations of open and closed periods of the inlet valve that have heretofore been described with reference to FIGS. 6 to 8.

These actions of valve actuator 51 are depicted diagrammatically in FIGS. 21 to 24 which show the relative positions of components of the actuator at different stages of operation. Dashed line 124 in FIGS. 21 to 24 represents the path of travel of the first and second cam follower rollers 104 and 106 which results from rotation of camshaft 53.

Figure 21:
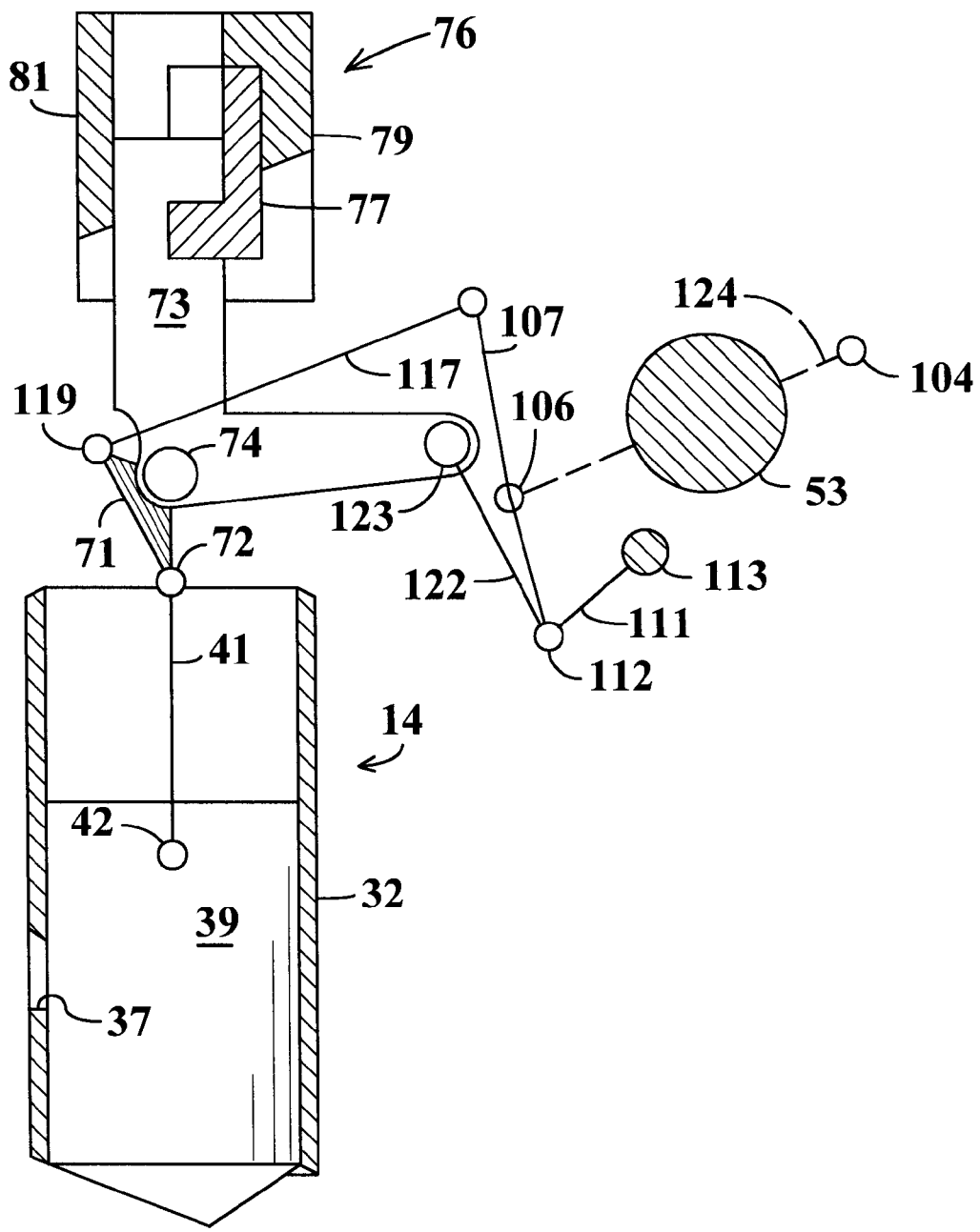
FIG. 21 is a diagrammatic illustration showing positions of components of the valve actuator mechanism when the engine is operating at minimum power output and the inlet valve is closed.
Figure 22:
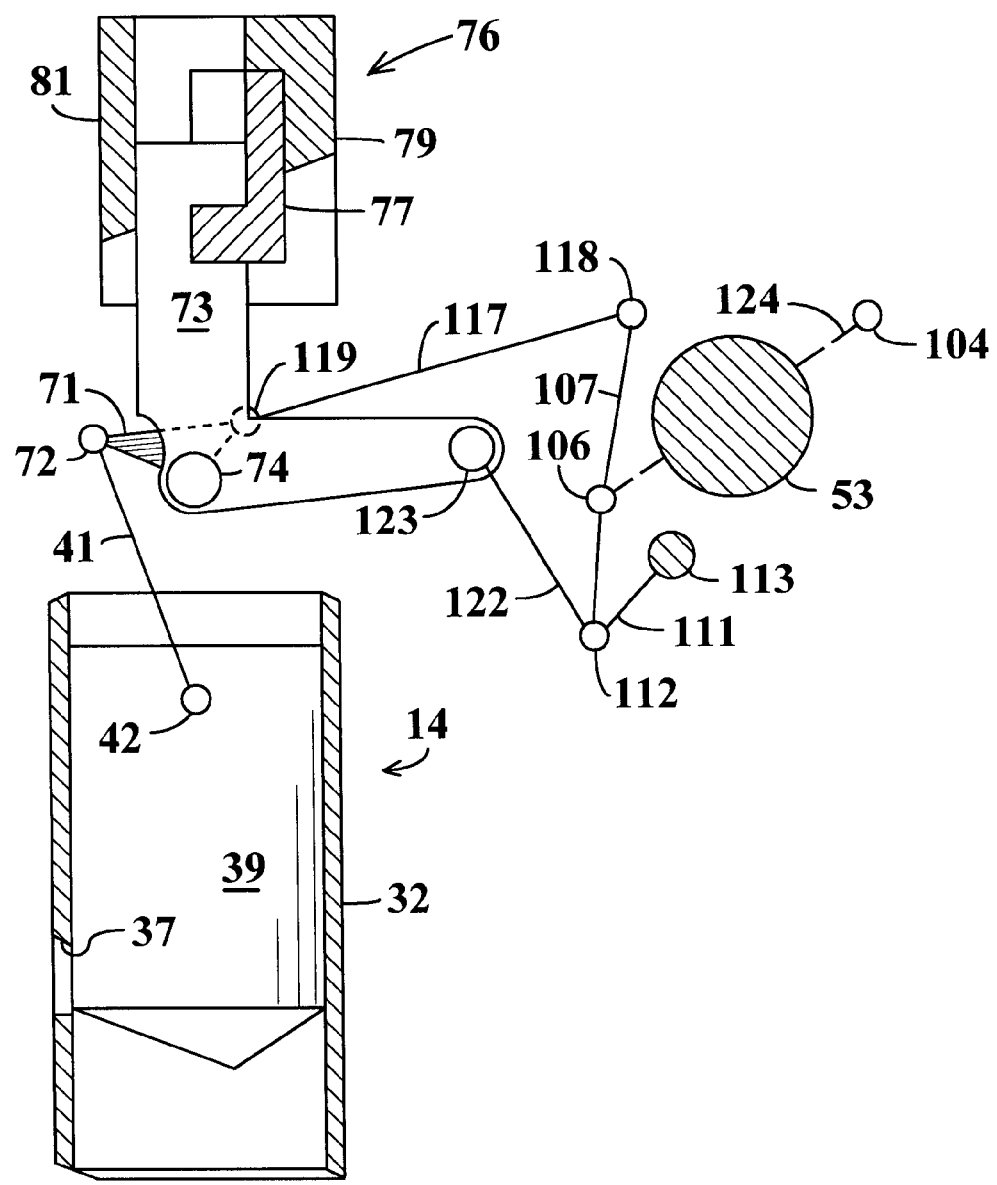
FIG. 22 is a diagrammatic illustration showing changed positions of components of the valve actuator mechanism when the engine is operating at minimum power output and the inlet valve is open.

FIG. 21 depicts the positions of components of actuator 51 when the engine is operating at minimum power output and the inlet valve 14 is closed. Anchoring clevis 73 and valve piston 39 are at their lowest positions. Valve piston 39 fills the lower region of valve sleeve 32 establishing the highest compression ratio. FIG. 22 depicts the positions of the components of actuator 51 at minimum power output with the inlet valve 14 at the open position. The position of anchoring clevis 73 remains unchanged. Camshaft 53 rotation has moved first cam follower roller 104 further away from the camshaft and drawn the second follower roller 106 towards the camshaft. Consequently, lever 107 has been pivoted towards the camshaft 53. Acting through link 117 the lever movement has turned bell crank 71 angularly. Turning of bell crank 71 has raised valve piston 39 sufficiently to provide for a minimal inflow of fuel and air mixture through fuel inlet ports 37.

Figure 23:
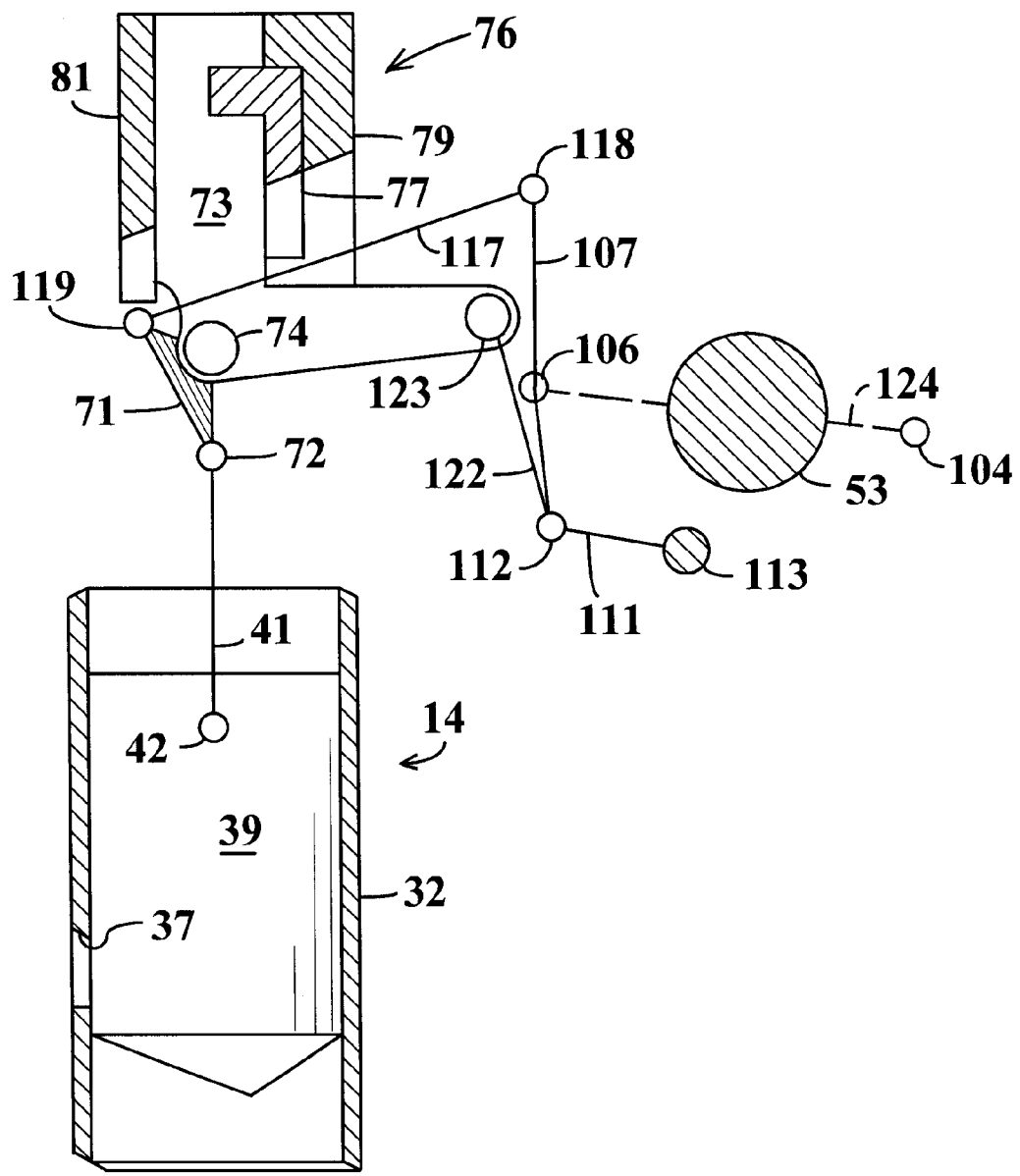
FIG. 23 is a diagrammatic illustration showing the positions of components of the valve actuator mechanism when the engine is operating at full power output and the inlet valve is closed.
Figure 24:
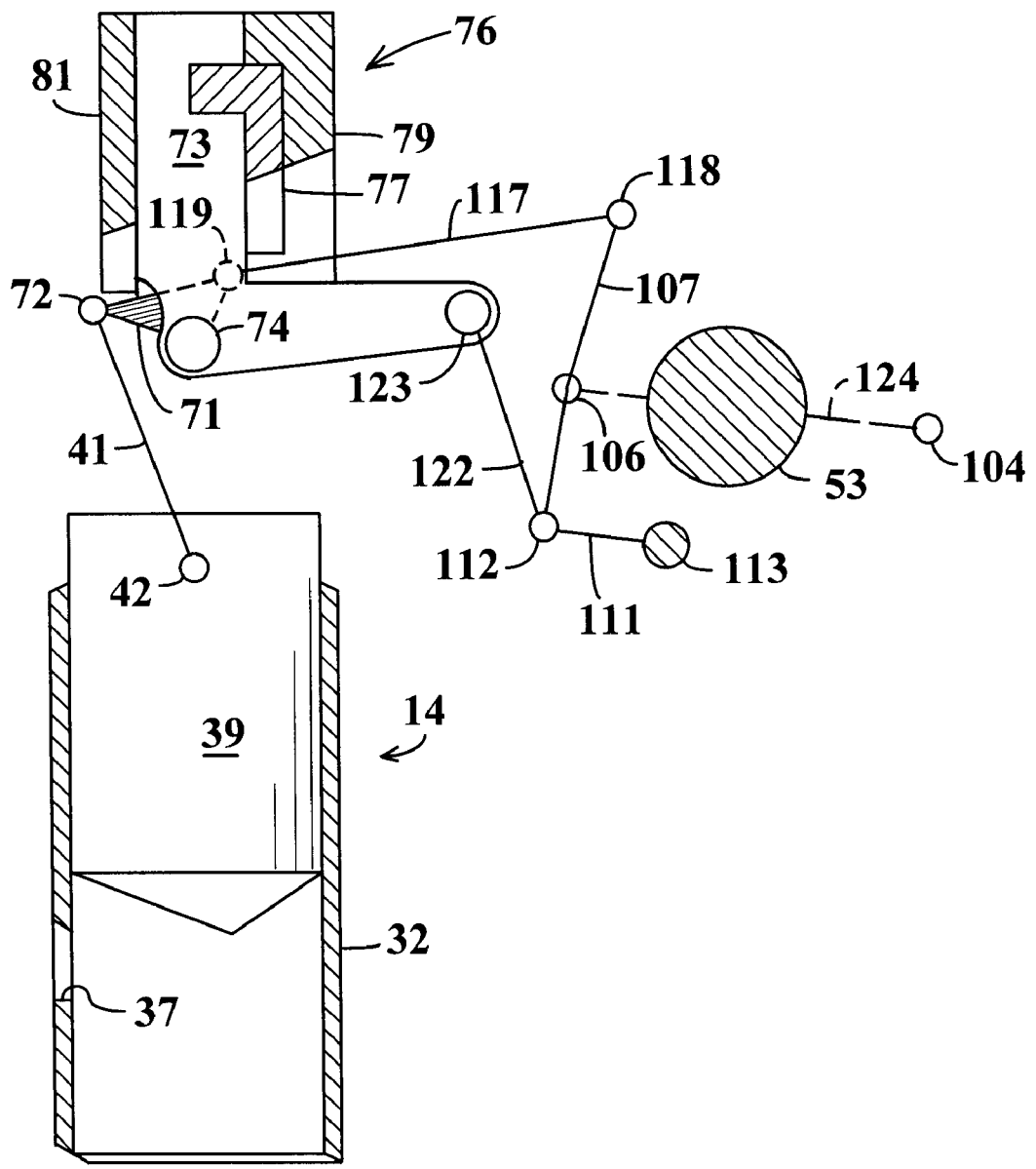
FIG. 24 is a diagrammatic illustration showing the positions of components of the valve actuator mechanism when the engine is operating at full power output and the inlet valve is open.

FIG. 23 shows the position of the valve actuator 51 components at the closed condition of the valve 14 after anchoring clevis 73 has been raised to provide maximum power output. Valve piston 39 does not extend to the bottom of valve sleeve 32 and thus the compression ratio is reduced in the manner which has been previously described. Clevis arm 121, acting through link 122, has raised pivot 112 along an arc centered on fixed pin 113 and has thereby raised control lever 107 and changed the angular orientation of the control lever. Acting through lever 107 this has also rotated the path of travel 124 of cam follower rollers 104 and 106 relative to camshaft 53 in a clockwise direction. These changes cause the arcuate path traveled by pivot 118 at the top of lever 107 in response to the reciprocating movement of cam follower rollers 104 and 106 to be shorter than it is under the minimum power conditions previously described with reference to FIGS. 21 and 22. FIG. 24 shows the changed positions of the components at the open position of valve 14 under the maximum power output condition. The angular movement of bell crank 71 and thus the vertical stroke of valve piston 39 under the maximum power condition of FIGS. 23 and 24 may be seen to be shorter than under the minimum power condition of FIGS. 21 and 22.

The progressive reduction in the length of the stroke of valve piston 39 and the raising of the valve piston as clevis 73 is raised to increase power output results in the changes in timing of opening and closing of valve 14 which have previously been described with reference to FIGS. 6, 7 and 8.

Referring jointly to FIGS. 21 and 23, an advantageous aspect of the above described valve actuator 51 mechanism is that the abrupt load force to which valve piston 39 is subjected when fuel ignition occurs is not transferred to linkage 88 and cams 89 and 91. At the closed position of the valve 14 pivots 42, 72 and 74 are in alignment with each other and are aligned with the centerline of piston 39. Consequently the high load force exerted against the bottom of piston 39 during fuel combustion is resisted by power control rack 77 rather than being transmitted to the cams and cam followers by linkage 88. This reduces wearing of these components of the valve actuator 51.

Inertia creates a load force which reacts on the cams and cam followers as valve piston 39 reaches the top of its stroke and reverses direction. This is more pronounced at high power output as piston velocity is greater at that time. The above described shortening of the stroke of valve piston 39 at higher power outputs reduces the inertia force and thereby further reduces wearing of the valve actuator mechanism. At high power output the inlet valve 14 does not close until after a compression stroke of the engine has begun as has been previously described with reference to FIG. 8. The rising pressure in the engine cylinder at that time exerts a cushioning effect on the valve piston 39 as it approaches the closed position. This causes the force which is exerted on the actuator mechanism at that time to be less abrupt. These aspects enable components of the valve actuator mechanism 51 to be lightly proportioned and to work at high speed with moderate stresses.

Figure 25:
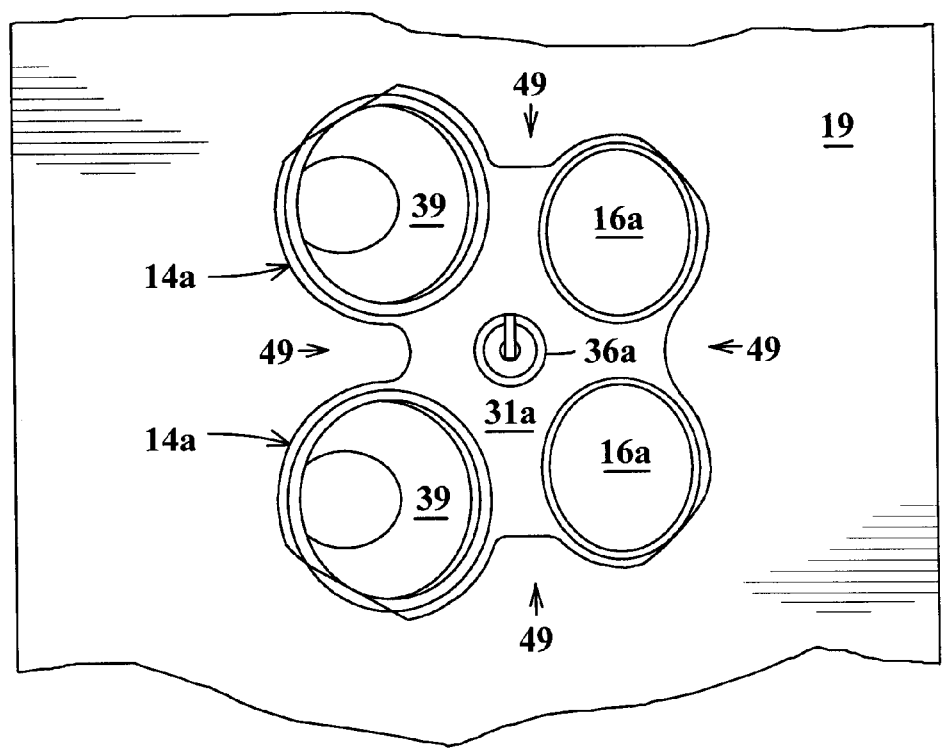
FIG. 25 is a view of the underside of the head member of another embodiment of the invention in which two inlet valves and two exhaust valves are present at each engine cylinder.

Referring again to FIGS. 2 and 3, the above described example of the invention has a single inlet valve 14 and a single exhaust valve 16 at each engine cylinder 13. FIG. 25 depicts the underside of the head member 19 of an engine which has two inlet valves 14a and two exhaust valves 16a at each cylinder. The design and operation of valves 14a and 16a may be similar to that of the previously described embodiment of the invention except insofar as the valves may be of smaller diameter while providing the same variation of compression ratio.

Providing four valves 14a, 16b at each cylinder adds to the complexity and cost of the engine but also has certain advantages. For example, the spark plug 36a may be at a more centered location over the cylinder which promotes a more rapid and even combustion of fuel. The combustion chamber recess 31a at the underside of head member 19 may be shaped to provide for more extensive fixed squish areas 49 at the top of the cylinder. The exhaust valves 16b may be lighter and thus impose less of a limitation on the rotational speed of the engine.

While the invention has been described with reference to certain specific embodiments for purposes of example, many modifications and variations are possible and it is not intended to limit the invention except as defined by the following claims.

What is claimed is:

1. In an internal combustion engine which has at least one power piston that reciprocates within an engine cylinder and which is coupled to an engine crankshaft and having a camshaft which is turned by the crankshaft and having an acceleration control which is movable to vary the power output of the engine, the improvement comprising:

a fuel inlet valve having a sleeve with an outlet end that opens into said engine cylinder and having at least one fuel inlet port in a sidewall of the sleeve, said fuel inlet valve having a valve piston which is movable along a path of travel which extends axially within said sleeve, said valve piston being movable away from said outlet end through open positions at which said outlet port is increasingly communicated with said outlet and being movable towards said outlet end into closed positions at which fuel flow from said inlet port to said outlet end is blocked by the valve piston, and a valve actuator having a first group of components interlinked to said valve piston which cyclically move said valve piston between open and closed positions in response to turning of said camshaft and having a second group of components interlinked to the valve piston which shifts said path of travel away from said outlet end in response to power increasing movements of said acceleration control and which shift said path of travel towards said outlet end in response to power decreasing movements of said acceleration control, said valve actuator including a linkage anchor member, a bell crank pivoted to said linkage anchor member and a link rod extending from said bell crank to said valve piston and being pivoted to each thereof; and wherein said first group of valve actuator components includes a cam follower which is reciprocated between two positions of rotation of said camshaft, said cam follower being interlinked to said bell crank to turn said bell crank between to angular orientations relative to said linkage anchor member thereby causing said link rod to open and close said inlet valve in response to rotation of said camshaft.

2. The apparatus of claim 1 wherein said bell crank is fastened to said linkage anchor member at a first pivot pin and said link rod is fastened to said bell crank at a second pivot pin and said link rod is fastened to said valve piston at a third pivot pin, said first and second and third pivot pins being positioned to be in alignment with each other and to be in alignment with said path of travel of said valve piston when inlet valve is closed whereby abrupt forces produced by fuel combustion in said cylinder are sustained by said linkage anchor member and are not transmitted to said cam follower.

3. The apparatus of claim 1 wherein said cam follower has a translatable shuttle supporting first and second spaced apart cam follower rollers which are situated at opposite sides of said camshaft, said shuttle being interlinked with said bell crank to open said fuel inlet valve in response to shuttle movement from a first shuttle position to a second shuttle position and to close said fuel inlet valve in response to shuttle movement from said second shuttle position to the first shuttle position, said camshaft having a first lobed cam contacted by said first follower roller and a second lobed cam contacted by said second follower roller, said first and second lobed cams being shaped to translate said shuttle from said first shuttle position to said second shuttle position and back to said first shuttle position during each revolution of said camshaft.

4. The apparatus of claim 3 wherein said linkage anchor member is movable in a first direction to increase power output of said engine and is movable in an opposite direction to decrease power output of said engine, said shuttle being turnable about said camshaft to vary the timing of opening and closing of said fuel inlet valve during a revolution of said camshaft and wherein said first group of valve actuator components includes components which interlink said shuttle with said linkage anchor member to turn said shuttle in a first angular direction in response to power increasing movements of said linkage anchoring member and to turn said shuttle in an opposite angular direction in response to power decreasing movements of said linkage anchoring member.

5. In an internal combustion engine which has at least one power piston that reciprocates within an engine cylinder and which is coupled to an engine crankshaft and having a camshaft which is turned by the crank shaft and having an acceleration control which is movable to vary the power output of the engine, the improvement comprising:

a fuel inlet valve having a sleeve with an outlet end that opens into said engine cylinder and having at least one fuel inlet port in a sidewall of the sleeve, said fuel inlet valve further having a valve piston which is movable along a path of travel which extends axially within said sleeve, said valve piston being movable away from said outlet end through open positions at which said inlet port is increasingly communicated with said outlet end and being movable towards said outlet end into closed positions at which fuel flow from said inlet port to said outlet end is blocked by the valve piston, and a valve actuator having a first group of components interlinked to said valve piston which cyclically move said valve piston between open and closed positions in response to turning of said camshaft and having a second group of components interlinked to the valve piston which shift said path of travel away from said outlet end in response to power increasing movements of said acceleration control and which shift said path of travel to wards said outlet end in response to power decreasing movements of said acceleration control, said valve actuator including a linkage anchor member, a crank member pivoted to said linkage anchor member and a link rod extending from an arm of said crank member to said valve piston and being pivoted to each thereof; and wherein said second group of valve actuator components includes a power control component which moves in response to movement of said acceleration control of said engine, said power control component being configured to move said link age anchor member further away from said outlet end of said fuel inlet valve sleeve in response to power increasing movement of said acceleration control and to advance said linkage anchor member towards said outlet end of said sleeve in response to power decreasing movement of said acceleration control.

6. The apparatus of claim 5 wherein said linkage anchor member has a slot therein and wherein said power control component includes a ramp which extends along said slot of said linkage anchor member, said slot and said ramp being inclined relative to said path of travel of said valve piston whereby movement of said ramp in a first direction moves said linkage anchor member further away from said outlet end of said sleeve and movement of the ramp in an opposite direction advances said linkage anchor member towards said outlet end.

7. The apparatus of claim 5 further including a servomotor coupled to said power control component and which moves said power control component in response to movement of said acceleration control of said engine.

8. In an internal combustion engine which has at least one power piston that reciprocates within an engine cylinder and which is coupled to an engine crankshaft and having a camshaft which is turned by the crank shaft and having an acceleration control which is movable to vary the power output of the engine, the improvement comprising:

a fuel inlet valve having a sleeve with an outlet end that opens into said engine cylinder and having at least one fuel inlet port in a sidewall of the sleeve, said fuel inlet valve further having a valve piston which is movable along a path of travel which extends axially within said sleeve, said valve piston being movable away from said outlet end through open positions at which said inlet port is increasingly communicated with said outlet end and being movable towards said outlet end into closed positions at which fuel flow from said inlet port to said outlet end is blocked by the valve piston, and a valve actuator having a first group of components interlinked to said valve piston which cyclically move said valve piston between open and closed positions in response to turning of said camshaft and having a second group of components interlinked to the valve piston which shift said path of travel away from said outlet end in response to power increasing movements of said acceleration control and which shift said path of travel to wards said outlet end in response to power decreasing movements of said acceleration control, wherein said valve piston is proportioned to locate an end surface of the valve piston at said outlet end of said sleeve when said inlet valve is closed and said engine is operating at minimum power output.

9. The apparatus of claim 8 wherein a first portion of said end surface of said valve piston is a flat area thereat which extends in substantially parallel relationship with a top surface of said power piston of said engine.

10. The apparatus of claim 9 wherein a second portion of said end surface of said valve piston extends from said flat first portion thereof and is inclined to extend outward from said top surface of said power piston when said valve piston is at said outlet end of said sleeve.

11. In an internal combustion engine which has at least one power piston that reciprocates within an engine cylinder and which is coupled to an engine crankshaft and having a camshaft which is turned by the crank shaft and having an acceleration control which is movable to vary the power output of the engine, the improvement comprising:

a fuel inlet valve having a sleeve with an outlet end that opens into said engine cylinder and having at least one fuel inlet port in a sidewall of the sleeve, said fuel inlet valve further having a valve piston which is movable along a path of travel which extends axially within said sleeve, said valve piston being movable away from said outlet end through open positions at which said inlet port is increasingly communicated with said outlet end and being movable towards said outlet end into closed positions at which fuel flow from said inlet port to said outlet end is blocked by the valve piston, and a valve actuator having a first group of components interlinked to said valve piston which cyclically move said valve piston between open and closed positions in response to turning of said camshaft and having a second group of components interlinked to the valve piston which shift said path of travel away from said outlet end in response to power increasing movements of said acceleration control and which shift said path of travel to wards said outlet end in response to power decreasing movements of said acceleration control, wherein said power piston of said engine reciprocates within an engine block having an engine head member secured thereto which head member has a recess forming a combustion chamber extension of said engine cylinder, wherein said fuel inlet valve extends within said head member with said outlet end of said valve sleeve being at said recess, said valve sleeve and valve piston and the path of travel of said valve piston being inclined relative to the direction of travel of said power piston of said engine, said valve piston having an end region which protrudes into said recess when the fuel inlet valve is closed and the engine is operating at minimum power output.

12. The apparatus of claim 11 wherein said end region of said valve piston has a flat area thereon which extends in substantially coplanar relationship with a bottom surface of said head member when the fuel inlet valve is closed and the engine is operating at minimum power output.

13. In an internal combustion engine which has at least one power piston that reciprocates within an engine cylinder and which is coupled to an engine crankshaft and having a camshaft which is turned by the crank shaft and having an acceleration control which is movable to vary the power output of the engine, the improvement comprising:

a fuel inlet valve having a sleeve with an outlet end that opens into said engine cylinder and having at least one fuel inlet port in a sidewall of the sleeve, said fuel inlet valve further having a valve piston which is movable along a path of travel which extends axially within said sleeve, said valve piston being movable away from said outlet end through open positions at which said inlet port is increasingly communicated with said outlet end and being movable towards said outlet end into closed positions at which fuel flow from said inlet port to said outlet end is blocked by the valve piston, and a valve actuator having a first group of components interlinked to said valve piston which cyclically move said valve piston between open and closed positions in response to turning of said camshaft and having a second group of components interlinked to the valve piston which shift said path of travel away from said outlet end in response to power increasing movements of said acceleration control and which shift said path of travel to wards said outlet end in response to power decreasing movements of said acceleration control, wherein said fuel inlet port in said sidewall of said sleeve has a first end which is closest to said outlet end of said sleeve and an opposite end which is further away from said outlet end of said sleeve, wherein said fuel inlet port is of minimal width at said first end thereof and becomes progressively wider towards said second end thereof.

14. In an internal combustion engine which has at least one power piston that reciprocates within an engine cylinder and which is coupled to an engine crankshaft and having a camshaft which is turned by the crank shaft and having an acceleration control which is movable to vary the power output of the engine, the improvement comprising:

a fuel inlet valve having a sleeve with an outlet end that opens into said engine cylinder and having at least one fuel inlet port in a sidewall of the sleeve, said fuel inlet valve further having a valve piston which is movable along a path of travel which extends axially within said sleeve, said valve piston being movable away from said outlet end through open positions at which said inlet port is increasingly communicated with said outlet end and being movable towards said outlet end into closed positions at which fuel flow from said inlet port to said outlet end is blocked by the valve piston, and a valve actuator having a first group of components interlinked to said valve piston which cyclically move said valve piston between open and closed positions in response to turning of said camshaft and having a second group of components interlinked to the valve piston which shift said path of travel away from said outlet end in response to power increasing movements of said acceleration control and which shift said path of travel to wards said outlet end in response to power decreasing movements of said acceleration control, wherein said fuel inlet port in said sidewall of said sleeve has a first end which is closest to said outlet end of said sleeve and an opposite end which is further away from said outlet end of said sleeve, wherein said fuel inlet port is of maximum width at said first end thereof and becomes progressively narrower towards said second end thereof.

15. In an internal combustion engine which has at least one power piston that reciprocates within an engine cylinder and which is coupled to an engine crankshaft and having a camshaft which is turned by the crank shaft and having an acceleration control which is movable to vary the power output of the engine, the improvement comprising:

a fuel inlet valve having a sleeve with an outlet end that opens into said engine cylinder and having at least one fuel inlet port in a sidewall of the sleeve, said fuel inlet valve further having a valve piston which is movable along a path of travel which extends axially within said sleeve, said valve piston being movable away from said outlet end through open positions at which said inlet port is increasingly communicated with said outlet end and being movable towards said outlet end into closed positions at which fuel flow from said inlet port to said outlet end is blocked by the valve piston, and a valve actuator having a first group of components interlinked to said valve piston which cyclically move said valve piston between open and closed positions in response to turning of said camshaft and having a second group of components interlinked to the valve piston which shift said path of travel away from said outlet end in response to power increasing movements of said acceleration control and which shift said path of travel to wards said outlet end in response to power decreasing movements of said acceleration control, wherein components of said first and second groups of valve actuator components are positioned to shorten said path of travel of said valve piston as said path of travel is moved away from said outlet end of said sleeve and to lengthen said path of travel when said path of travel is moved towards said outlet end of said sleeve.

16. In an internal combustion engine which has at least one power piston that reciprocates within an engine cylinder and which is coupled to an engine crankshaft and having a camshaft which is turned by the crank shaft and having an acceleration control which is movable to vary the power output of the engine, the improvement comprising:

a fuel inlet valve having a sleeve with an outlet end that opens into said engine cylinder and having at least one fuel inlet port in a sidewall of the sleeve, said fuel inlet valve further having a valve piston which is movable along a path of travel which extends axially within said sleeve, said valve piston being movable away from said outlet end through open positions at which said inlet port is increasingly communicated with said outlet end and being movable towards said outlet end into closed positions at which fuel flow from said inlet port to said outlet end is blocked by the valve piston, and a valve actuator having a first group of components interlinked to said valve piston which cyclically move said valve piston between open and closed positions in response to turning of said camshaft and having a second group of components interlinked to the valve piston which shift said path of travel away from said outlet end in response to power increasing movements of said acceleration control and which shift said path of travel to wards said outlet end in response to power decreasing movements of said acceleration control, wherein said valve actuator means shorten said path of travel of said valve piston as said path of travel is moved away from said outlet end of said sleeve and lengthen said path of travel when said path of travel is moved towards said outlet end of said sleeve.

17. In an internal combustion engine which has at least one power piston that reciprocates within an engine cylinder and which is coupled to an engine crankshaft and having a camshaft which is turned by the crank shaft and having an acceleration control which is movable to vary the power output of the engine, the improvement comprising:

a fuel inlet valve having a sleeve with an outlet end that opens into said engine cylinder and having at least one fuel inlet port in a sidewall of the sleeve, said fuel inlet valve further having a valve piston which is movable along a path of travel which extends axially within said sleeve, said valve piston being movable away from said outlet end through open positions at which said inlet port is increasingly communicated with said outlet end and being movable towards said outlet end into closed positions at which fuel flow from said inlet port to said outlet end is blocked by the valve piston, and a valve actuator having a first group of components interlinked to said valve piston which cyclically move said valve piston between open and closed positions in response to turning of said camshaft and having a second group of components interlinked to the valve piston which shift said path of travel away from said outlet end in response to power increasing movements of said acceleration control and which shift said path of travel to wards said outlet end in response to power decreasing movements of said acceleration control, wherein said engine has an engine block in which said cylinder is situated and has a head member overlaying said engine block, said head member having a recess forming an extension of the cylinder combustion chamber, wherein said valve actuator means protrude said valve piston into said recess when said engine is operating at minimum power output and retract said valve piston away from said recess when said engine is operating at higher power outputs.

18. The apparatus of claim 17 wherein said valve piston has an end surface facing said engine cylinder, said end surface having a squish enhancing flat area which extends in substantially parallel relationship with a top surface of said engine piston.

* * * * *